United States Patent
Standish et al.

(10) Patent No.: US 6,600,106 B2
(45) Date of Patent: Jul. 29, 2003

(54) CABLE MANAGEMENT BAR AND PATCH PANEL

(75) Inventors: Craig M. Standish, Bloomington, MN (US); John David Schmidt, Shakopee, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 09/903,408

(22) Filed: Jul. 11, 2001

(65) Prior Publication Data

US 2003/0010521 A1 Jan. 16, 2003

(51) Int. Cl.[7] ................................................. H02G 3/00
(52) U.S. Cl. .................. 174/68.3; 174/72 R; 174/72 A; 52/220.7
(58) Field of Search .............................. 174/68.3, 72 R, 174/72 A, 95, 97, 99 R; 361/826; 220/3.2, 3.3, 4.02; 52/220.7

(56) References Cited

U.S. PATENT DOCUMENTS

| | | | | |
|---|---|---|---|---|
| 3,611,264 A | * | 10/1971 | Ellis, Jr. .................... | 339/99 R |
| 5,299,956 A | * | 4/1994 | Brownell et al. .......... | 439/638 |
| 5,639,261 A | * | 6/1997 | Rutkowski et al. ......... | 439/534 |
| 5,674,093 A | * | 10/1997 | Vaden ........................ | 439/676 |
| 5,778,130 A | * | 7/1998 | Walters et al. .............. | 385/134 |
| 5,836,786 A | * | 11/1998 | Pepe ........................... | 439/557 |
| 5,975,962 A | * | 11/1999 | Laukonis .................... | 439/713 |
| 6,003,273 A | * | 12/1999 | Elsholz et al. .............. | 52/220.7 |
| 6,347,715 B1 | * | 2/2002 | Drozdenko et al. ........... | 211/26 |

OTHER PUBLICATIONS

ADC, engineering drawing, one page (revisions dated Aug. 13, 1999 and Feb. 15, 2001).*
ADC Publication, 2 pages, document M169 03/00 Revision © 1999, 2000 ADC Telecommunications, Inc. Mar. 2000.*
Anixter, "1996 Structured Cabling Solutions Catalog", front cover, p. 1–23 and back cover (1996).*
AT&T Bell Labs, "Patchmax™ Distribution Hardware Installation Instructions", six pages (1996).*
Hubbell, Ltd., "Solutions By Design, Hubbell Premise Wiring Full Line Catalog 2200", front cover, p. 60 and back cover (no date).*
Lucent Technologies, "Systimax® Structured Connectivity Solutions Product Guide", front cover, pp. 3–27, 3–34, 3–35, 3–36 and back cover (1998).*
The Siemon Company, "The Siemon Company Catalog 1999", front cover, pp. 4.3, 4.5, 5.9, 5.11, and back cover(1999).*

* cited by examiner

Primary Examiner—Dean A. Reichard
Assistant Examiner—W. David Walkenhorst
(74) Attorney, Agent, or Firm—Merchant & Gould P.C.

(57) ABSTRACT

A telecommunications patch panel including a frame member defining a plurality of connector locations, the frame member including front and rear faces, and a first flange extending outwardly from the rear face including at least two tabs. Also included is a cable management member with first and second legs including notch portions and a cable bar coupled to the first and second legs. The notch portions on the cable management member may be engaged within the tabs located on the frame member so as to detachably couple the cable management member to the frame member.

22 Claims, 2 Drawing Sheets

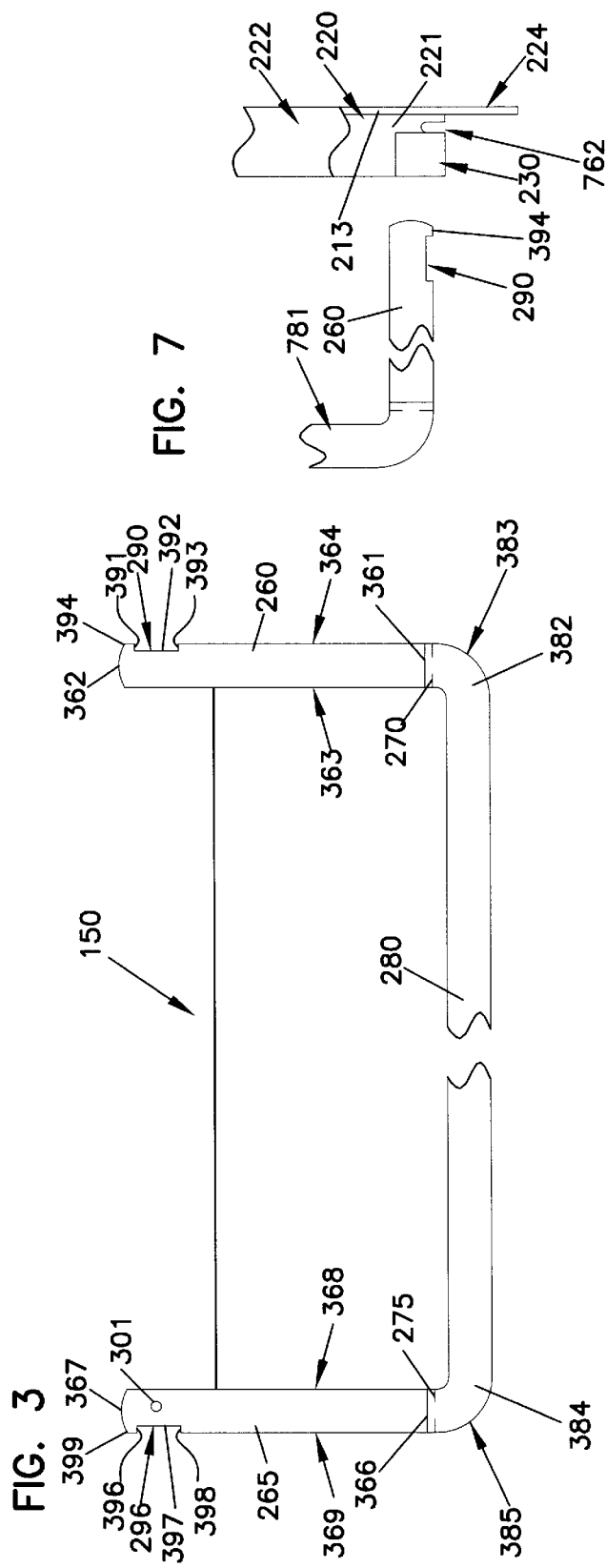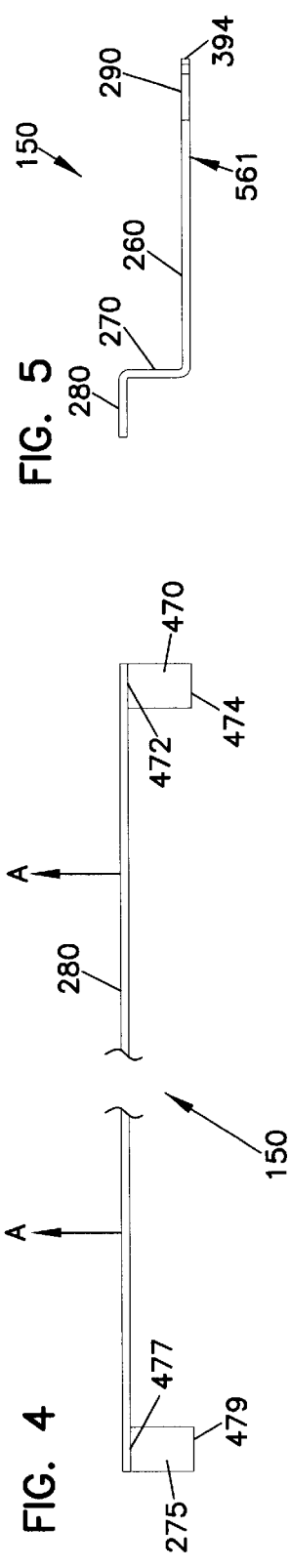

CABLE MANAGEMENT BAR AND PATCH PANEL

TECHNICAL FIELD

The present invention relates to a telecommunications connecting panel and, more particularly, to a patch panel including a frame member detachably coupled to a cable management bar.

BACKGROUND

Local area networks and telecommunications connections often use patch panels, especially at the customer's premises, to enable inter- or cross-connection between telecommunications equipment. Patch panels typically comprise a frame member including plurality of connector locations wherein any of a variety of jacks, including, but not limited to, copper and fiber, may be mounted. The jacks allow for fairly rapid connection and disconnection between two jacks in the same patch panel, or between one jack in the patch panel and another jack in a nearby patch panel, with a patch cord. One type of jack and plug arrangement for a patch panel is an RJ45 type connector, described in U.S. Pat. No. 5,639,261. Other patch panels and jacks are shown and described in U.S. Pat. Nos. 5,299,956 and 5,674,093.

There is an increasing need for cable management in order to keep the various cables organized and protected from damage. One area where damage and/or loss of performance may occur with cables is when excessive bending of the cable occurs. A cable management bar provides a support structure whereon the plurality of cables running to the connector locations may be supported to alleviate any excessive bending.

Various concerns arise in the case of cable management bars. One concern is that the bars may be difficult to mount if they mount to the rack or cabinet at mounting locations different from the panel mounting locations and separate hardware pieces are used to mount the bars to the rack or cabinet. In addition, if the bars are permanently affixed to the panels, not every situation requires bars, thereby resulting in unnecessary structure in the rack or cabinet.

There is a need for improved patch panels and cable management bars.

SUMMARY

A telecommunications patch panel according to one aspect of the invention includes a frame member defining a plurality of connector locations, the frame member including front and rear faces and a first flange extending outwardly from the rear face including at least two tabs.

According to another aspect of the present invention, the patch panel may include a cable management member with first and second legs including notch portions and a cable bar coupled to the first and second legs.

In accordance with a further aspect of the invention, the notch portions on the cable management member may be engaged within the tabs located on the frame member so as to detachably couple the cable management member to the frame member.

BRIEF DESCRIPTION OF THE DRAWINGS

FIG. 3 is a top view of a cable management member in accordance with an exemplary embodiment of the present invention.

FIG. 4 is a rear view of the cable management member of FIG. 4.

FIG. 5 is a side view of the cable management member of FIG. 4.

FIG. 7 is a top view of the frame member and cable management member in accordance with an example embodiment of the invention.

DETAILED DESCRIPTION OF THE PREFERRED EMBODIMENT

Figure 1:
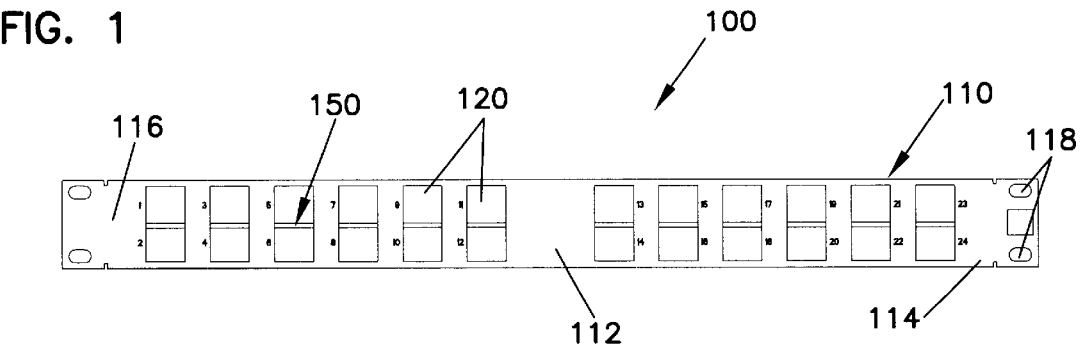
FIG. 1 is a front view of an embodiment of a patch panel in accordance with the present invention including an exemplary frame member and an exemplary cable management member.

Referring now to FIG. 1, an embodiment of a patch panel 100 with a frame member 110 including a front face 112 is shown for use in inter- or cross connecting telecommunications equipment. Also shown behind the frame member 110 is a cable management member 150. Patch panel 100 may be mounted to a rack or cabinet of conventional construction (not shown), such as with fasteners passing through openings 118 of the frame member 110. Frame member 110 defines a plurality of connector locations 120 between a first frame end 114 and a second frame end 116, wherein any of a variety of jacks or connector elements, including, but not limited to, copper and fiber, may be mounted. For example, RJ45 jacks, coax connectors, and fiber optic adapters can be mounted in connector locations 120, such as with snaps.

Figure 2:
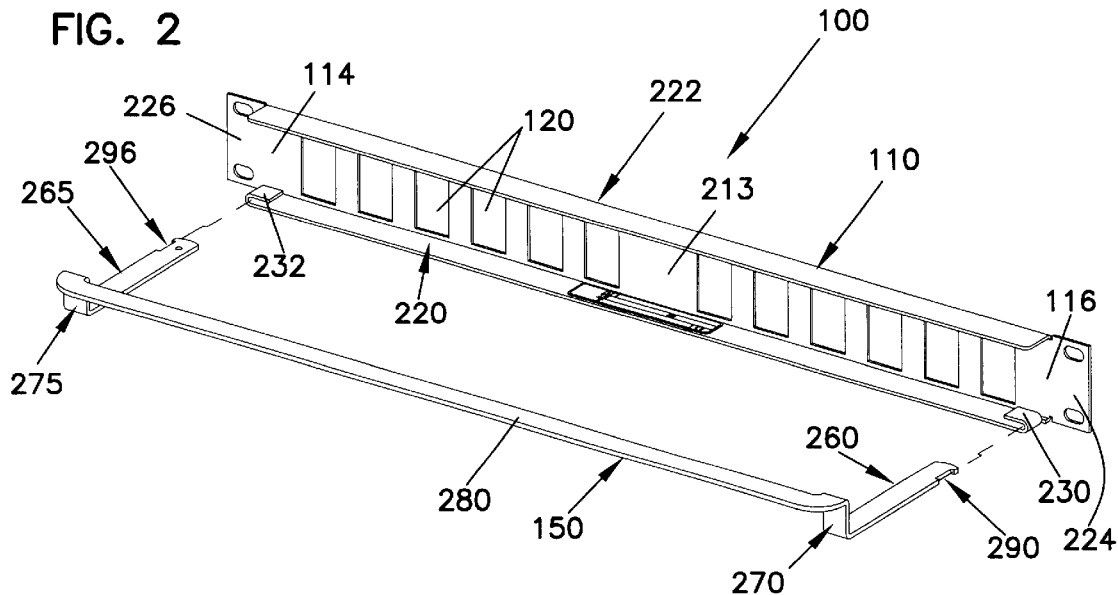
FIG. 2 is a rear perspective view of a patch panel in accordance with the present invention illustrating a frame member as well as an exemplary cable management member.

In FIG. 2, a rear perspective of the patch panel 100 is provided illustrating a rear face 213 of the frame member 110. Further included are a first flange 220 with a flange surface 221 and a second flange 222, as well as tabs 230 and 232 positioned on the first flange 220 proximate the first and second frame ends 114 and 116. It should be understood that only one flange is necessary and that the first flange need not extend fully between first and second frame ends 114 and 116 as shown. The frame member 110 further includes first and second end flanges 224 and 226 positioned at the first and second frame ends 114 and 116, wherein the first and second end flanges 224 and 226 may be used to mount the frame member 110 to a support structure such as a rack or cabinet. Structure and methods other than first and second end flanges may also be used to mount the frame member 110 to a rack or cabinet, such as, for example, the frame member may be integrally attached to a rack during manufacture of the rack itself.

Also shown in FIG. 2 is an exemplary embodiment of the cable management member 150 in accordance with the present invention. The cable management member 150 includes first and second legs 260 and 265, first and second vertical portions 270 and 275 and cable bar 280. The first and second legs 260 and 266 further each define notch portions 290 and 296.

The exemplary embodiment of the cable management member 150 is shown in greater detail in FIGS. 3–5. The first leg 260 includes first and second ends 361 and 362 as well as an inner surface 363 and an outer surface 364. Likewise, second leg 265 includes first and second ends 366 and 367 as well as an inner surface 368 and an outer surface 369. Also provided in FIG. 3 is a hole 301 on the second leg 265 so as to allow for the hanging of the cable management bar 150 during manufacturing. Also shown in FIG. 5 is a side surface 561 of the first leg 260. The first notch portion 290 defined in first leg 260 comprises first, second, and third notch surfaces 391, 392, and 393 which form a C-shape. The second notch portion 296 includes similar notch surfaces 396, 397, and 398. Also included on the first and second legs 260 and 265 are first and second notch ends 394 and 399 positioned at the second ends 362 and 367. The first and second legs 260 and 265 are positioned generally in a parallel arrangement.

The first ends 361 and 366 of first and second legs 260 and 265 are coupled to the first and second vertical portions 270 and 275 at first portion ends 474 and 479, respectively. The first and second vertical portions 270 and 275 extend vertically in relation to the first and second legs 260 and 265, terminating in first portion ends 472 and 477.

The first portion ends 472 and 477 of the first and second vertical portions 270 and 275 are coupled to first and second bar ends 382, 384 of the cable bar 280. The vertical portions 270, 275 may be coupled to the cable bar 280 using rounded corners 383 and 385, such that no sharp edges are presented that may damage the patch cords or present a hazard to a technician. Because of the first and second vertical portions 270 and 275, the cable bar 280 is vertically offset in relation to the first and second flanges 220 and 222 of the frame member 110. In one embodiment of the present invention, the cable bar 280 is positioned so as to be horizontally aligned with a middle section of the plurality of connector locations 120. In this manner, cables extending toward the rear face 213 can be supported by cable bar 280. Ties or straps can be used to secure the cables to the cable bar 280. Other positions for the cable bar 280 in a differently shaped cable management member 150 may also be used.

Figure 6:
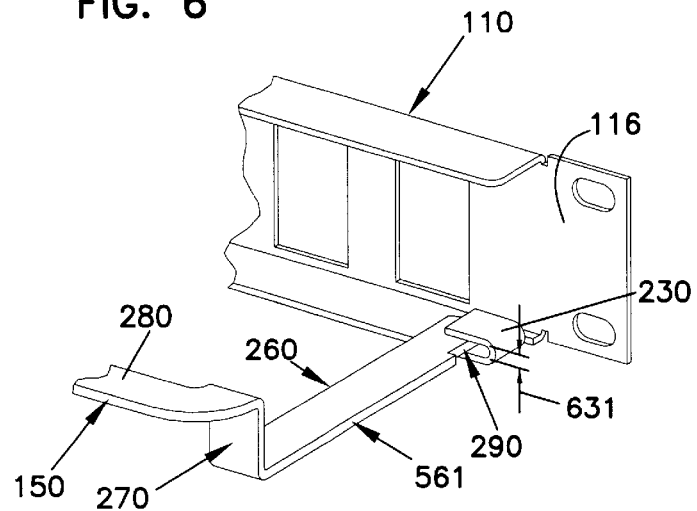
FIG. 6 is a perspective view of a portion of the patch panel of FIG. 2, detailing the interconnection between the exemplary frame member and the exemplary cable management member.

The frame member 110 and cable management member 150 may be detachably coupled, as is best illustrated through examination of FIGS. 6–7. In FIGS. 6–7, only the first frame end 116 and first leg 260 are illustrated, however, it should be understood that a similar relationship is provided for second frame end 226 and second leg 265. The tab 230 is U-shaped, defining a space 631 between the tab 230 and the flange surface 221. The second end 362 of the first leg 260 may be positioned within this space so that the first notch portion 390 may engage the tab 230. The first notch portion surfaces 391, 392, and 393 are positioned and biased by the force of the cable bar 280 to partially surround the tab 230. The side surface 561 of the first leg 260 is positioned and maintained against the flange surface 221, and the first notch surface 391 is maintained against the tab 230 and the first notch end 394 positioned between the tab 230 and the rear face 213, thereby detachably coupling the cable management member 150 to the frame member 110.

To decouple the cable management member 150 from the frame member 110, force may be applied to either or both of the outer surfaces 364, 369 of the first and second legs 260, 265. This applied force causes the cable bar 280 to bow slightly in a direction A as shown in FIG. 4, causing either or both of the first and second legs 260, 265 to translate toward each other. This causes the notch surfaces 391, 392, 393 and 396, 397, 398 to detach from the tabs 230, 232 and finally allows the notch ends 394, 399 to clear the tabs 230, 232. In this manner, the cable management member 280 may be detached from the frame member 110. Further included is indentation 762 defined within the first flange 220 so as to facilitate the creation of the tabs 230, 232 while providing space for the notch ends 394, 399.

The frame member 110 and cable management member 150 may both be preferably made from bent sheet metal. For example, the frame member 110 may be formed from a single sheet of metal bent to form flanges 220 and 222 and tabs 230 and 232, and cutouts may be used to create the plurality of connector locations 120. Likewise, the cable management member 150 may preferably be formed by bending a contiguous sheet of metal to form legs 260 and 265, vertical portions 270 and 275, and cable bar 280. The cable bar, and the first and second legs may be formed such that each has a major planar surface facing in the same direction A. This configuration may be advantageous in that the bent sheet metal provides a flattened surface 781 on which the cables may rest and be attached thereto.

In accordance with the exemplary embodiments described above, the cable management member 150 may be detachably mounted to the frame member 110 itself, rather than being mounted to a rack or cabinet. Because the cable management member 150 mounts directly to the frame member 110, there is no need for additional structure on the rack or cabinet for mounting the cable management member 150. Also, no additional hardware or holes are necessary. In addition, a cable management member in accordance with the present invention may be easily removed when not needed and may further be retrofitted to a frame member if needed at a later point.

The above specification, examples and data provide a complete description of the manufacture and of the invention. Since many embodiments of the invention can be made without departing from the spirit and scope of the invention, the invention resides in the claims hereinafter appended.

What is claimed is:

1. A frame member for use in a telecommunications patch panel, the frame member comprising:

a front face and an opposite facing rear face, a first frame end and a second frame end;

a plurality of connector locations disposed between the first frame end and the second frame end; and a first flange extending outwardly from the rear face, the first flange including a first tab positioned on the first flange proximate the first frame end and a second tab positioned on the first flange proximate the second frame end, wherein the first and second tabs are U-shaped and define openings facing each other.

2. The frame member of claim 1, wherein the first flange extends from the first frame end to the second frame end.

3. The frame member of claim 1, further comprising a second flange extending outwardly from the rear face in a direction parallel to the first flange.

4. The frame member of claim 1, further comprising first and second end flanges, wherein the first and second end flanges each include at least one opening.

5. The frame member of claim 1, wherein the front face, the rear face, the first flange, and the first and second tabs of the frame member are formed from bent sheet metal.

6. The frame member of claim 1, wherein the first and seconds tabs are positioned on the first flange spaced-apart from the rear face.

7. The frame member of claim 6, wherein the first flange further defines at least one indentation formed between the first tab and the rear face.

8. A cable management member for use in a telecommunications patch panel, the cable management member comprising:

a horizontal cable bar including a first bar end and a second bar end;

a first vertical portion positioned generally vertically with respect to the horizontal cable bar and coupled at a first portion end to the first bar end of the horizontal cable bar;

a second vertical portion positioned generally vertically with respect to the horizontal cable bar and coupled at a first portion end to the second bar end of the horizontal cable bar;

a first leg with first and second ends and inner and outer surfaces, the first leg being coupled to the first vertical portion at a second portion end and the first leg further defining a first notch portion positioned at the outer surface and the second end; and a second leg with first and second ends and inner and outer surfaces, the second leg being coupled to the second vertical portion at a second portion end and the second leg further defining a second notch portion positioned at the outer surface and the second end.

9. The cable management member of claim 8, wherein the first and second notch portions are spaced apart from the second ends of the first and second legs so as to define first and second notch ends.

10. The cable management member of claim 9, wherein the first and second notch portions include first, second, and third notch surfaces defining a C-shape.

11. The cable management member of claim 8, wherein the first and second legs are positioned parallel to one another and the first and second vertical portions are positioned parallel to one another.

12. The cable management member of claim 8, wherein the cable bar, and the first and second legs are formed from bent sheet metal, the cable bar and the first and second legs each having a major planar surface facing in the same direction.

13. A telecommunications patch panel comprising:

a frame member including a front face with an opposing rear face, a first frame end and a second frame end with a plurality of connector locations disposed between the first frame end and the second frame end, and further including a first tab positioned proximate the first frame end and a second tab positioned proximate the second frame end; and a cable management member including first and second legs with first and second ends and a cable bar with first and second bar ends, wherein the cable bar is coupled at the first bar end to the first end of the first leg and at the second bar end to the first end of the second leg and wherein the second ends of the first and second legs further define first and second notch portions, wherein the cable management member is detachably coupled to the frame member by slidably engaging the first notch portion with the first tab and the second notch portion with the second tab.

14. The telecommunications patch panel of claim 13, further comprising first and second vertical portions on the cable management member, wherein the first vertical portion is positioned between the first bar end and the first end of the first leg and the second vertical portion is positioned between the second bar end and the first end of the second leg.

15. The telecommunications patch panel of claim 14, wherein the cable bar is vertically positioned so as to be horizontally aligned with a middle section of the plurality of connector locations.

16. The telecommunications patch panel of claim 13, wherein the first and second notch portions are formed on an outer surface of the first and second legs.

17. The telecommunications patch panel of claim 13, wherein the first and second notch portions are formed so as to include first, second, and third notch surfaces defining a C-shape.

18. The telecommunications patch panel of claim 17, wherein the first notch surface of the first notch portion is positioned between the rear face and the first tab when the cable management member is detachably coupled to the frame member so as to retain the engagement.

19. The telecommunications patch panel of claim 18, wherein the cable bar is flexible wherein the cable bar bows when pressure is applied to the outer surface of the first leg so as to translate the first leg in a direction of the inner surface of the first leg to disengage the first notch surface of the first notch portion from the first tab, thereby detaching the first leg of the cable management member from the frame member.

20. The telecommunications patch panel of claim 13, further comprising a flange extending outwardly from the rear surface, wherein the first and second tabs are positioned on the flange.

21. The telecommunications patch panel of claim 20, wherein the first and second legs further include side surfaces so that a flange surface of the flange is positioned to support at least a portion of the side surfaces of the first and second legs.

22. The telecommunications patch panel of claim 13, wherein the frame member and the cable management member are both formed from bent sheet metal.

* * * * *